Patented June 15, 1954

2,681,291

UNITED STATES PATENT OFFICE 2,681,291

ALUMINUM STEARATE COMPOSITION

Kenneth D. Ashley, Stamford, Conn., assignor to American Cyanamid Company, New York, N. Y., a corporation of Maine No Drawing. Application October 27, 1951, Serial No. 253,558

3 Claims. (Cl. 106—243)

This invention relates to the production of aluminum stearate compositions, and more particularly, to the production of an aluminum stearate product having a composition and properties such that it can be used as a pigment suspending agent in paints and enamels. The invention includes both a new method for producing an aluminum stearate composition particularly adapted for use as a suspending agent in paints as well as the new aluminum stearate composition itself, as will hereinafter be more fully described.

For use in paints and enamels an aluminum stearate is required having a good pigment suspending action; i. e. one which will prevent or retard settling of the pigment in the bottom of the can when used in amounts of about 0.25% to 1% by weight in the paint. Both of the commercially available aluminum stearates; i. e. aluminum tristearate and aluminum distearate, have been tested for this purpose. Experience has shown, however, that the aluminum distearate is not suitable as it causes gelation in the paints when used in sufficient quantities to function as an effective pigment suspending agent.

Aluminum tristearate, therefore, is the aluminum stearate that is best suited for use in paint and enamel manufacture. This stearate, however, as produced commercially, usually contains considerable quantities of hard grainy material that is very undesirable in paint manufacture. These grains do not become completely dispersed in the paints during the grinding operation; they lower the efficiency of the stearate as a suspending agent, and the large grains appear as imperfections in the paint film. It is a principal object of the present invention to avoid the presence of such lumps or grains in aluminum stearate compositions.

Aluminum tristearate is produced commercially by reacting an aqueous dispersion of sodium stearate with a water solution of an aluminum salt, preferably aluminum sulfate or aluminum chloride, using 3 mols of sodium stearate for each atom of aluminum. The resulting aluminum stearate precipitate is washed free from water-soluble salts and dried, and it is during the drying procedure that the undesirable grainy material is formed. I have found that the formation of this undesirable material takes place in the following manner.

My experiments have shown that in the so-called aluminum tristearate of commerce the third stearic acid molecule is either unattached or is so weakly attached that it cannot withstand drying. As soon as the temperature of the soap exceeds the melting point of stearic acid (about 69°–70° C.) the free stearic acid that is either present originally or formed by soap decomposition begins to fuse. Fusion of this type forms the grainy material. Even when the greatest care is exercised during the drying step, with resulting reduction in the capacity of the drying equipment, substantial quantities of lumps or grains appear in the product.

My present invention avoids the formation of grainy material in aluminum stearates, while producing a composition having the high pigment-suspending action and low gel-forming properties of aluminum tristearate. This is done by dry blending or grinding, at a temperature below the melting point of stearic acid, of approximately equimolecular quantities of stearic acid and aluminum distearate. By so mixing, there is formed a composition chemically equivalent to aluminum tristearate. I have found, by experiment, that this composition has the same good pigment-suspending action and low gel-forming properties in paints and enamels that are characteristic of the aluminum tristearate of commerce. My dry blended mixture, however, being prepared at temperatures below the melting point of stearic acid, is completely free from lumpy or grainy material, and therefore produces paints and enamels of much better texture and improved appearance in the finished paint films.

The aluminum di-stearate employed in practicing the process of my invention can be prepared by any suitable procedure. Usually an aqueous dispersion containing 2 mols of sodium stearate and 1 mol of sodium hydroxide is reacted with 1 mol of an aluminum salt, such as aluminum sulfate or aluminum chloride, in accordance with the equation

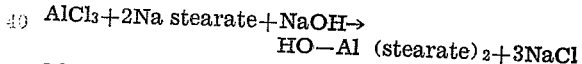

$$AlCl_3 + 2Na\ stearate + NaOH \rightarrow HO-Al\ (stearate)_2 + 3NaCl$$

The resulting aluminum distearate precipitate is washed free from salt and can be dried at 105° to 115° C. in a tray dryer or other suitable drying equipment since there is no danger of decomposition. The resulting dried powder, usually having a moisture content of about 3–6%, is dry blended with sufficient dry powdered stearic acid to produce a composition containing about 65–75% by weight of aluminum distearate and 25–35% of stearic acid. The mixing is of course carried out at temperatures below the melting point of stearic acid, and usually at about 25°–35° C. Any suitable dry mixing equipment may be employed, a ribbon blender having given good results in practice. The resulting dry powder is storage-stable, is easily dispersed in paints and enamels in the quantities of 0.25%–0.5% usually employed for pigment suspension, and is therefore well suited for its purpose.

The pigment suspending properties of my new aluminum stearate composition are shown in the following specific example.

*Example*

A flat wall paint was prepared by milling together the following ingredients until a uniform dispersion was obtained, the quantities being parts by weight:

| | |
|---|---|
| Pigment (30% $TiO_2$–70% $CaSO_4$) | 620 |
| Calcium carbonate | 120 |
| Silica (Celite No. 110) | 40 |
| Drying oil vehicle | 475 |

To this paint there was added 0.5% by weight of an aluminum distearate-stearic acid blend of the present invention containing about 1 mol of stearic acid (about 31–32% by weight) for each mol of aluminum distearate and the paint was stored at room temperature and examined at 30 day intervals. Settling tests were made by A. S. T. M. Method D869–46T, which consists in measuring the resistance of the paint to a square-ended spatula. After 30 days there was practically no settling, as indicated by lack of resistance to the spatula, and the same condition was found after 60 days and after 90 days storage. Panel tests made with the paint showed a good coat, free from spots or other imperfections and a complete absence of sagging.

What I claim is:

1. A method of preparing an aluminum stearate composition of uniform texture suitable for use as a suspending agent in paints which comprises intimately mixing together, at a temperature below the melting point of stearic acid, about 25% to 35% by weight of dry finely divided stearic acid and about 75% to 65% by weight of dry finely divided aluminum distearate.

2. A method of preparing an aluminum stearate composition of uniform texture suitable for use as a suspending agent in paints which comprises intimately mixing together, at a temperature below the melting point of stearic acid, equimolecular quantities of dry finely divided stearic acid and dry finely divided aluminum distearate.

3. An aluminum stearate composition of uniform texture suitable for use as a suspending agent in paints obtained by the method set forth in claim 1.

References Cited in the file of this patent

UNITED STATES PATENTS

| Number | Name | Date |
|---|---|---|
| 2,315,029 | Wetton | Mar. 30, 1943 |

OTHER REFERENCES

Metallic Soaps (published by Metasap Chemical Co.), 1940, page 26.

Von Fischer: "Paint and Varnish Technology," Reinhold Publishing Corp., N. Y., 1948, pages 278 and 279.